(12) United States Patent
Ponnuswamy

(10) Patent No.: US 9,686,004 B2
(45) Date of Patent: Jun. 20, 2017

(54) ADAPTIVE METHODS FOR OPTIMIZING SOUNDING AND CHANNEL FEEDBACK OVERHEAD IN SU-MIMO AND MU-MIMO BEAM FORMING

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 257 days.

(21) Appl. No.: 14/069,173

(22) Filed: Oct. 31, 2013

(65) Prior Publication Data
US 2015/0117325 A1   Apr. 30, 2015

(51) Int. Cl.
*H04B 7/06* (2006.01)
*H04L 5/00* (2006.01)

(52) U.S. Cl.
CPC ......... *H04B 7/0617* (2013.01); *H04B 7/0619* (2013.01); *H04L 5/0023* (2013.01); *H04L 5/0048* (2013.01); *H04L 5/0082* (2013.01)

(58) Field of Classification Search
CPC .. H04B 7/0408; H04B 7/0413; H04B 7/0617; H04B 7/0619; H04B 7/14; H04L 5/0048; H04L 5/0082; H04L 5/0023
See application file for complete search history.

(56) References Cited

U.S. PATENT DOCUMENTS

| | | | |
|---|---|---|---|
| 8,295,263 B1 * | 10/2012 | Chen et al. | 370/345 |
| 8,379,745 B1 * | 2/2013 | Nabar et al. | 375/267 |
| 2007/0117590 A1 * | 5/2007 | Aldana | 455/562.1 |
| 2007/0230373 A1 * | 10/2007 | Li et al. | 370/267 |
| 2007/0270154 A1 * | 11/2007 | Kim et al. | 455/450 |
| 2014/0010319 A1 * | 1/2014 | Baik et al. | 375/267 |
| 2014/0071955 A1 * | 3/2014 | Du et al. | 370/336 |
| 2014/0086071 A1 * | 3/2014 | Hu et al. | 370/252 |

\* cited by examiner

*Primary Examiner* — Yemane Mesfin
*Assistant Examiner* — Peter Chen
(74) *Attorney, Agent, or Firm* — Brooks, Cameron & Huebsch, PLLC

(57) ABSTRACT

Disclosed herein is a system, apparatus, and method for optimizing sounding and feedback overhead in a wireless digital network utilizing a beamforming technique by adaptively changing the frequency of sounding transmissions. The exemplary method comprises: transmitting a first plurality of sounding frames based on a first sounding interval, wherein the first sounding interval is a first period of time between transmissions of two sounding frames in the first plurality of sounding frames; receiving a plurality of feedback frames comprising information associated with the first plurality of sounding frames; based on the plurality of feedback frames: selecting a second sounding interval, different than the first sounding interval, for transmitting a second plurality of sounding frames; and transmitting the second plurality of sounding frames based on the second sounding interval, wherein the second sounding interval is a second period of time between transmissions of two sounding frames in the second plurality of sounding frames.

17 Claims, 6 Drawing Sheets

ADAPTIVE METHODS FOR OPTIMIZING SOUNDING AND CHANNEL FEEDBACK OVERHEAD IN SU-MIMO AND MU-MIMO BEAM FORMING

FIELD

Embodiments of the disclosure relate to wireless digital networks, and in particular, to the problem of reducing overhead associated with explicit channel state feedback.

BACKGROUND

The IEEE 802.11n and the draft IEEE 802.11 ac standards include the use of the multiple-input multiple-output (MIMO) technology in wireless digital networks operating in accordance with the IEEE 802.11 family of standards. The availability of multiple antennas necessitated by the introduction of the MIMO technology allows the beamforming technique to be utilized to improve the performance, that is, to increase the data rates and/or to decrease the error rate.

By exploiting radio frequency (RF) conditions between the transmitter and the receiver, a beamforming transmitter (beamformer) is capable of steering RF signal power maxima onto an intended receiver (beamformee) by appropriately weighting data streams transmitted through two or more transmit antennas while transmitting a signal.

The IEEE 802.11n standard includes the technique of transmit beamforming (TxBF), which is to be used in transmitting data between a wireless network device and a single client device at a time, and the draft IEEE 802.11 ac standard specifies the technique of downlink multi-user MIMO (MU-MIMO), through the use of which a wireless access point can transmit separate data on separate spatial streams to multiple client devices simultaneously. The draft IEEE 802.11 ac standard utilizes the beamforming technique at the wireless network device in the MU-MIMO mode to minimize interference among spatial streams intended for different client devices.

An accurate estimate at the beamformer of the RF conditions between the transmitter and the receiver, i.e., the channel state, is critical for the operation of the beamforming technique, whether in a single-user TxBF mode or in a MU-MIMO mode. Explicit feedback is one of the better methods of deriving at the beamformer an estimate of the channel state. The IEEE 802.11n standard includes the explicit feedback technique that can be used with the beamforming technique, and the draft IEEE 802.11ac standard requires explicit feedback when the beamforming technique is utilized.

With explicit feedback, the beamformer transmits a sounding frame including known content, and the beamformee receives the sounding frame, estimates the channel from the frame, generates channel state information and sends the information back to the beamformer. The beamformer then utilizes this information to generate and weight streams of data transmitted through its antennas for the operation of the beamforming technique.

Under certain circumstances, explicit feedback may introduce significant overhead and reduce the throughput available for actual data transmissions. The interval between transmissions of two explicit feedback cycles needs to be very small for a proper operation of MU-MIMO, especially when a 64-quadrature amplitude modulation (64-QAM) or a 256-QAM modulation and coding scheme (MCS) is utilized. For example, a wireless access point with a 3×3 (3 transmit antennas and 3 receive antennas) antenna configuration communicating with three client devices each having a 1×1 antenna configuration on an 80 MHz-wide channel in the MU-MIMO mode has to receive approximately 3000 bytes of feedback information every 10 milliseconds, in addition to the sounding overhead.

Because overhead associated with explicit channel state feedback is one of the critical parameters in deciding whether the beamforming technique should be used and determining the overall system efficiency, it is important to develop methods to minimize overhead without sacrificing RF or system performance.

BRIEF DESCRIPTION OF THE DRAWINGS

Embodiments of the disclosure may best be understood by referring to the following description and accompanying drawings that are used to illustrate embodiments of the disclosure by way of example and not limitation. In the drawings, in which like reference numerals indicate similar elements.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

Disclosed herein, one embodiment of the invention is directed to a system, apparatus, and method for optimizing sounding and feedback overhead in a wireless digital network utilizing the beamforming technique by adaptively changing the frequency of sounding transmissions. The exemplary method comprises: transmitting a first plurality of sounding frames based on a first sounding interval, wherein the first sounding interval is a first period of time between transmissions of two sounding frames in the first plurality of sounding frames; receiving a plurality of feedback frames comprising information associated with the first plurality of sounding frames; based on the plurality of feedback frames: selecting a second sounding interval, different than the first sounding interval, for transmitting a second plurality of sounding frames; and transmitting the second plurality of sounding frames based on the second sounding interval, wherein the second sounding interval is a second period of time between transmissions of two sounding frames in the second plurality of sounding frames.

Of course, other features and advantages of the disclosure will be apparent from the accompanying drawings and from the detailed description that follows below.

The disclosure herein describes embodiments with reference to the IEEE 802.11n and the draft IEEE 802.11 ac standards. However, the invention is not so limited and can be adapted for wireless digital networks operating under other standards within the spirit and scope of the embodiments disclosed herein.

Figure 1A:
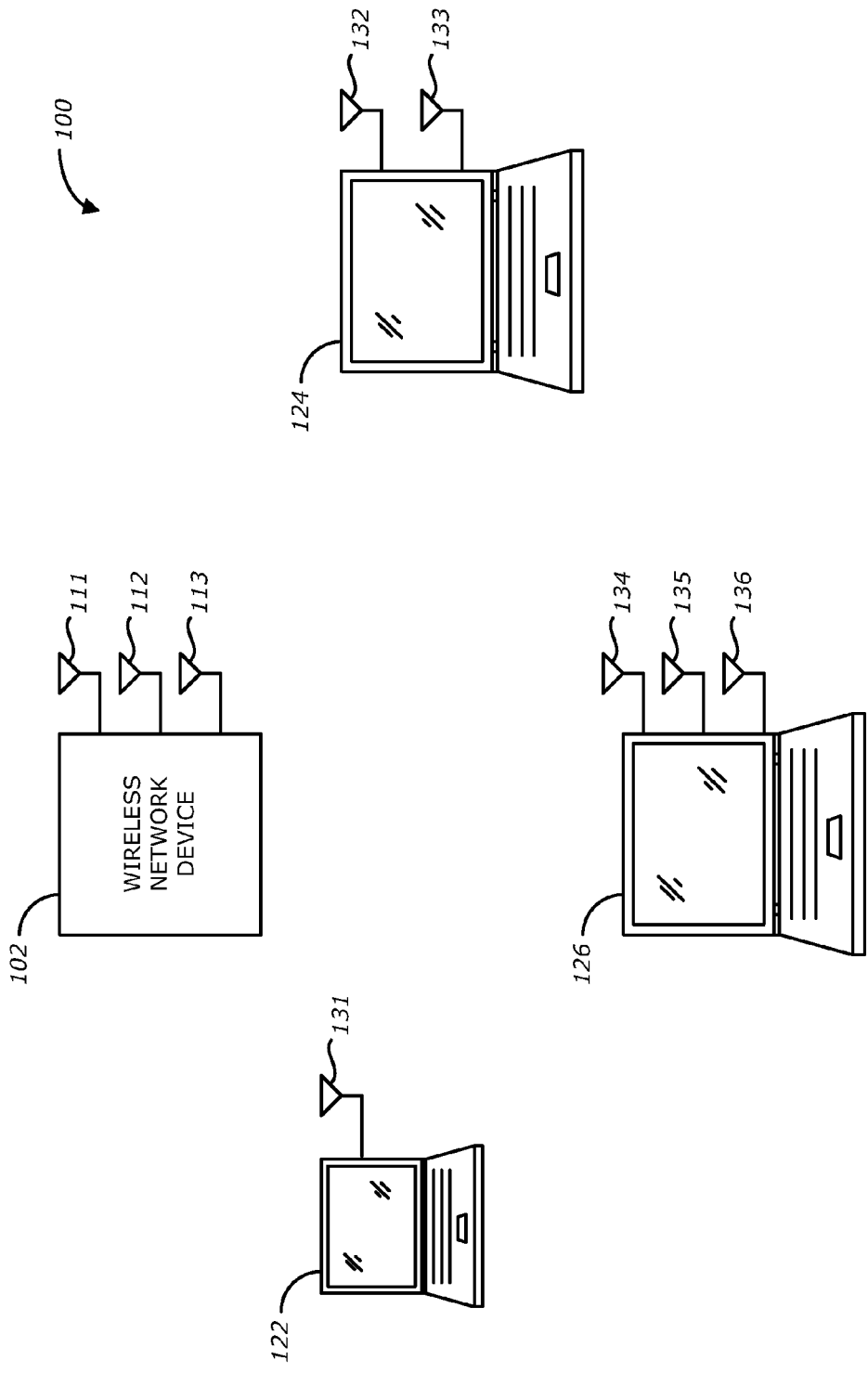
FIG. 1A illustrates a hardware environment of an exemplary wireless digital network in which embodiments of the disclosure may be practiced.

FIG. 1A illustrates a hardware environment of an exemplary wireless digital network 100 in which embodiments of the disclosure may be practiced. A exemplary wireless network device 102 (e.g., a wireless access point, or a mesh node, etc.) is connected to a data network (not shown) and provides data access services to exemplary client devices 122, 124, and 126 through RF wireless communication. The wireless network device 102 operates in conformity with one or more standards in the IEEE 802.11 family of standards. In one embodiment, the wireless network device 102 supports the IEEE 802.11n, IEEE 802.11g, IEEE 802.11b, and IEEE 802.11a standards. In another embodiment, the wireless network device 102 supports all the aforementioned IEEE 802.11 standards and the draft IEEE 802.11 ac standard.

Of course, it is contemplated that the invention is not so limited and a number of different combinations of supported IEEE 802.11 standards are possible. Embodiments of the disclosure require only that the wireless network device 102 supports at least one of the IEEE 802.11n and the draft IEEE 802.11ac standards. The wireless network device 102 may operate on either one or both of the 2.4 GHz RF band and the 5 GHz RF band while operating in conformity with the IEEE 802.11n standard, and operates on the 5 GHz RF band only while operating in conformity with the draft IEEE 802.11ac standard.

In the wireless digital network 100 illustrated in FIG. 1A, the wireless network device 102 includes three antennas 111, 112, and 113. The wireless network device 102 may be capable of driving some or all of its antennas as either transmit antennas or receive antennas. The invention is not limited by the number of antennas included in the wireless network device 102 and the wireless network device 102 may include only two antennas, or may include more than three antennas. The wireless network device 102 is capable of driving at least two transmit antennas.

The IEEE 802.11n standard allows up to four separate spatial streams, while the draft IEEE 802.11 ac standard allows up to eight separate spatial streams. Each spatial stream may be transmitted through one or more transmit antennas. Therefore, the number of spatial streams supported by the wireless network device 102 is limited by the number of transmit antennas it is capable of driving. Moreover, some implementations of the wireless network device 102 may support fewer spatial streams than would be allowed by the number of transmit antennas present.

Client devices 122, 124, and 126 may be any electronic devices capable of accessing wireless digital networks operating in accordance with one or more standards in the IEEE 802.11 family of standards. Examples include laptops, cellphones, tablets, game consoles, smart TVs, set-top boxes, etc. In examples shown in FIG. 1A, the client devices 122, 124, and 126 include one, two, and three antennas 131, 132, 133, 134, 135, and 136, respectively. As with the wireless network device 102, the invention is not limited by the number of antennas included in client devices. The invention is not limited with respect to the number of client devices, either. There may be fewer than or more than three client devices in an actual use environment where embodiments of the present disclosure may be practiced. In one embodiment, all client devices 122, 124, and 126 support at least one of the IEEE 802.11n and the draft IEEE 802.11 ac standards. In another embodiment, some of the client devices 122, 124, and 126 support at least one of the IEEE 802.11n and the draft IEEE 802.11 ac standards, while the others do not support either. In an embodiment where not all client devices support at least one of the IEEE 802.11n and the draft IEEE 802.11ac standards, aspects of the present invention may be practiced with respect to client devices that do support at least one of the IEEE 802.11n and the draft IEEE 802.11 ac standards.

Figure 1B:
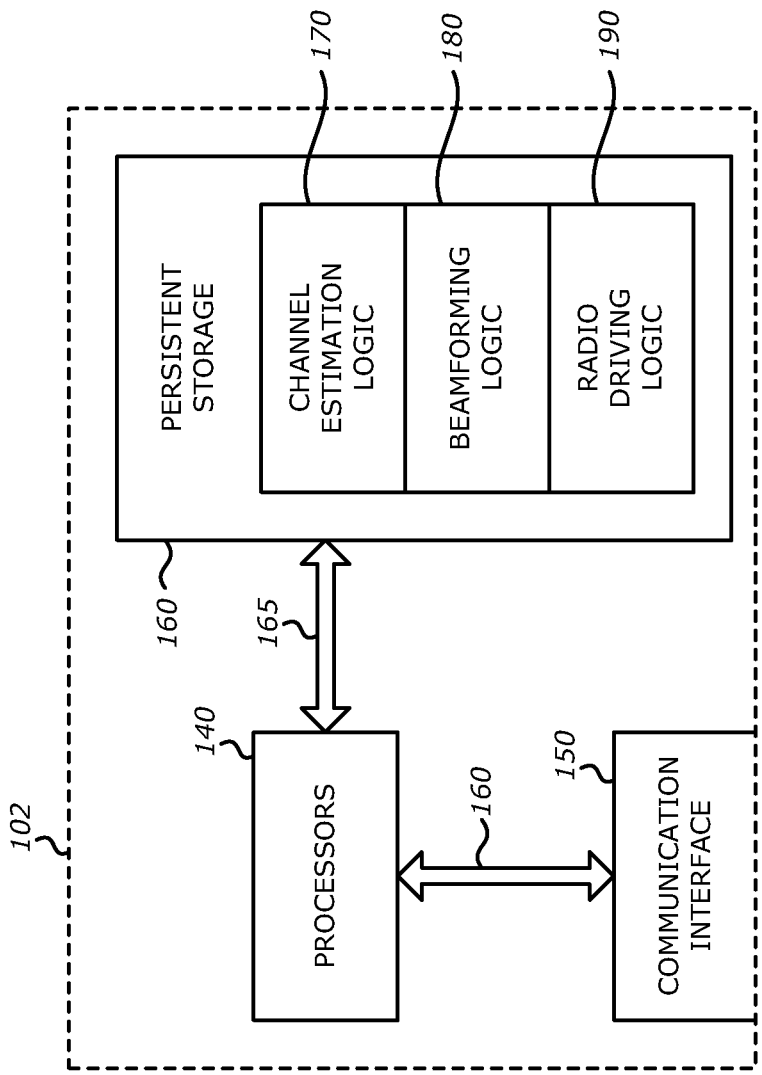
FIG. 1B is an exemplary block diagram of logic associated with an exemplary wireless network device.

Referring now to FIG. 1B, an exemplary block diagram of logic associated with the wireless network device 102 is shown. The wireless network device 102 comprises one or more processors 140 that are coupled to communication interface logic 150 via a first transmission medium 160. Communication interface logic 150 enables communications with the data network (not shown) and with client devices 122, 124, and 126. According to one embodiment of the disclosure, communication interface logic 150 may be implemented as one or more radio units coupled to antennas 111, 112, and 113 for supporting wireless communications with other devices. Additionally, communication interface logic 150 may be implemented as a physical interface including one or more ports for wired connectors.

Processor 140 is further coupled to persistent storage 160 via transmission medium 165. According to one embodiment of the disclosure, persistent storage 160 may include channel estimation logic 170, beamforming logic 180, and radio driving logic 190. Of course, when implemented as hardware, channel estimation logic 170, beamforming logic 180, and radio driving logic 190 would be implemented separately from persistent memory 160.

Embodiments of the disclosure are practiced in the context of the beamforming technique. Beamforming allows a transmitting device with more than one antenna to steer RF signal power maxima onto a receiving device using Digital Signal Processing techniques, enabling higher signal-to-noise ratio (SNR) and hence higher data rates and/or lower error rates. This is achieved by carefully controlling the phase of the signal transmitted through multiple antennas to optimize the overall pattern of the beamformed signal.

Among the standards in the IEEE 802.11 family, transmit beamforming (TxBF) with respect to one-to-one communications between a wireless network device and one client device at a time is first specified in the IEEE 802.11n standard. The draft IEEE 802.11 ac standard specifies the technique of downlink multi-user MIMO (MU-MIMO), through the use of which a wireless network device can transmit separate data on separate spatial streams to multiple client devices simultaneously. The draft IEEE 802.11ac standard requires the use of the beamforming technique at the wireless network device in the MU-MIMO mode to minimize interference among RF chains intended for different client devices.

For the beamforming technique of the IEEE 802.11n or the draft IEEE 802.11ac standard to work properly, an accurate estimate at the beamformer of RF conditions between the transmit antennas at the beamformer and the receive antennas at the beamformee, i.e., the channel state, is indispensable.

Explicit feedback is one of the better methods of deriving at the beamformer an accurate estimate of the channel state. Explicit feedback is one of the specified beamforming feedback methods in the IEEE 802.11n standard and is the required beamforming feedback method in the draft IEEE 802.11 ac standard.

With explicit feedback, the beamformer first transmits a sounding frame. A sounding frame is a frame carrying known training symbols, which allow the receiver to estimate a channel state for each subcarrier. And the beamformee receives the sounding frame, estimates the channel, generates channel state information, and sends the information back to the beamformer. The transmitter then utilizes this information to generate and weight streams of data transmitted through its antennas to optimize the overall pattern of the beamformed signal.

The IEEE 802.11n standard specifies three methods of explicit beamforming feedback. In the first method, the beamformee returns raw channel state information (CSI), which consists of a set of complex factors indicating how each beamformee antenna hears each beamformer spatial stream. The beamformer then takes the CSI matrix and calculates the weights it should use to optimize the signals transmitted through its antennas.

In the second and third methods of explicit beamforming, the beamformee calculates the V-matrix, which includes the set of weights the transmitter should use for beamforming to maximize the SNR. In the second method, also known as the explicit full V-matrix method, the full V-matrix is returned to the beamformer, which can then use it for beamforming.

The amount of data in the CSI matrix or the full V-matrix can be very large: it includes coordinates for each orthogonal frequency-division multiplexing (OFDM) subcarrier (According to IEEE 802.11 standards, the available bandwidth of a RF channel is subdivided into equal-bandwidth subchannels. A subcarrier is a carrier signal associated with a subchannel.), per-transmit stream, per-receive antenna, and with a reasonable degree of precision. In consideration for the drawback, the IEEE 802.11n standard includes a third method: the compressed V-matrix method, where the beamformee compresses V-matrix in the form of Givens angles, which are sent to the beamformer along with SNR figures. The beamformer then uses these Givens angles for beamforming.

Givens angles included in the compressed V-matrix feedback are generated using the following steps. First, the channel matrix (H) is calculated from the received sounding frame. Second, H is decomposed into H=S×V, where S is a real diagonal matrix and V is an orthogonal matrix. Last, V can be represented as a series of Givens rotations, $\phi(\ )$ and $\psi(\ )$, where $\phi$ represents the relative phase difference between various components of V and $\psi$ represents the relative amplitude difference between various components of V.

The draft IEEE 802.11 ac standard has eliminated the raw CSI and the explicit full V-matrix methods, and retains the compressed V-matrix method as the only explicit feedback method for beamforming.

However, even with the compressed V-matrix method, sounding and feedback overhead may still be significant under certain circumstances. The interval between transmissions of two explicit feedback cycles needs to be in the order of milliseconds for a proper operation of MU-MIMO, especially when a 64-QAM or a 256-QAM MCS is utilized. For example, a wireless network device with a 3×3 antenna configuration communicating with three client devices each having a 1×1 antenna configuration on an 80 MHz-wide channel in the MU-MIMO mode has to receive approximately 3000 bytes of feedback information every 10 milliseconds, in addition to the sounding overhead.

The present invention aims to optimize sounding and feedback overhead by adaptively changing the interval between transmissions of two explicit feedback cycles. It should be appreciated that changing the interval between transmissions of two explicit feedback cycles is equivalent to changing the frequency of transmitting the sounding frame from the beamformer.

Embodiments of the disclosure are described herein with reference to the compressed V-matrix method of explicit feedback. It should be appreciated that the methods may be adapted for the other aforementioned explicit feedback methods within the spirit and scope of the embodiments disclosed herein.

Moreover, embodiments of the disclosure are described herein with reference to a wireless digital network configuration having one or more beamformees each receiving two spatial streams with two receive antennas. The invention is not so limited and can be adapted for different receive antenna and spatial stream configurations within the spirit and scope of the embodiments disclosed herein.

A skilled artisan would recognize that with the compressed V-matrix method, a feedback frame sent by a beamformee receiving two spatial streams with two receive antennas contains two Givens angles (Givens angles $\alpha$ and $\beta$) as well as the SNR at the beamformee for each OFDM subcarrier.

Embodiments of the disclosure described herein operate as follows for every TxBF beamformee or a set of client devices identified for a MU-MIMO burst (hereinafter client-set).

Figure 2:
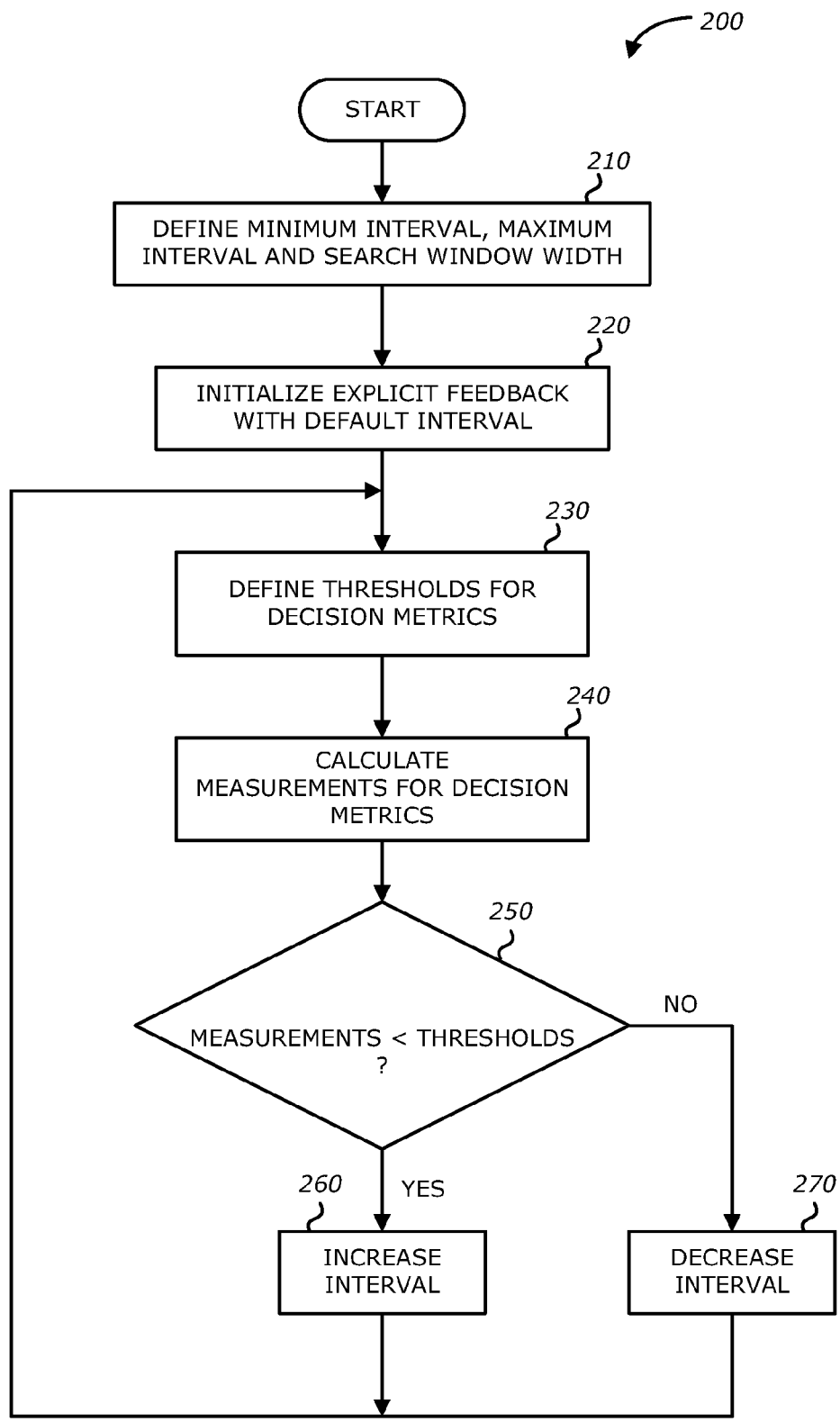
FIG. 2 is an exemplary flowchart illustrating a method for optimizing sounding and feedback overhead by adaptively changing the frequency of transmitting the sounding frame.

Referring to FIG. 2, an exemplary flowchart illustrating a method 200 for optimizing sounding and feedback overhead by adaptively changing the frequency of transmitting the sounding frame is shown. At operation 210, minimum and maximum intervals between transmissions of two sounding frames and a search window width N are defined. The search window width N is a number larger than 2 and may be selected strategically. At next operation 220, the explicit feedback method is initialized with a default sounding interval. In one embodiment, the default sounding interval is 10 milliseconds. At next operation 230, thresholds for one or more decision metrics are defined. The decision metrics may be related to Givens angles and/or SNR. A decision metric is a metric based on which a decision as to whether and/or how to change the sounding interval is made. The one or more decision metrics may include one or more of minimum differences (MIN ($\Delta\alpha$) and/or MIN ($\Delta\beta$)), maximum differences (MAX ($\Delta\alpha$) and/or MAX ($\Delta\beta$)), or average differences (AVG ($\Delta\alpha$) and/or AVG ($\Delta\beta$)) between corresponding Givens angles $\alpha$ and $\beta$ in two feedback frames across all (or a subset thereof) OFDM subcarriers. Alternatively or additionally, the one or more decision metrics may include one or more of a minimum difference (MIN ($\Delta$SNR)), a maximum difference (MAX ($\Delta$SNR)), or an average difference (AVG ($\Delta$SNR)) between corresponding SNR figures in two feedback frames across all (or a subset thereof) OFDM subcarriers. It should be appreciated that SNR figures may be utilized to define thresholds for decision metrics relating to Givens angles because the SNR indicates the maximum MCS/data rate that can be used. The list of possible decision metrics provided herein is not exhaustive, and the invention is not limited by the decision metrics used. At next operation 240, measurements for the one or more decision metrics are derived for all feedback frames starting from the second feedback frame received after the initialization or after the last change in the interval between transmissions of two sounding frames. At next operation 250, a comparison between the measurements and the thresholds for the decision metrics is made. In the embodiment described herein, it is determined whether the measurements for the one or more decision metrics have been below the thresholds defined at operation 240 for the previous N feedback frames since the initialization or the last change in the interval between transmissions of two sounding frames.

If it is determined at operation 250 that the measurements for the one or more decision metrics have been below the thresholds defined at operation 240 for the previous N feedback frames since the initialization or the last change in the interval between transmissions of two sounding frames, the method moves onto operation 260, where the interval between transmissions of two sounding frames is increased if the interval is not already the maximum interval defined at operation 210. A number of methods may be utilized to determine the amount of the increase. In one embodiment, the interval is increased by a fixed number of milliseconds. In another embodiment, the interval is increased to the midpoint between the current interval and the maximum interval defined at operation 210.

If it is determined at operation 250 that not all the measurements for the one or more decision metrics have been below the thresholds defined at operation 240 for the previous N feedback frames since the initialization or the last change in the interval between transmissions of two sounding frames, the method moves onto operation 270, where the interval between transmissions of two sounding frames is decreased if the interval is not already the minimum interval defined at operation 210. A number of methods may be utilized to determine the amount of the decrease. In one embodiment, the interval is decreased by a fixed number of milliseconds. In another embodiment, the interval is decreased to the midpoint between the current interval and the minimum interval defined at operation 210.

After either operation 260 or operation 270, the method 200 returns to operation 230 and repeats operations 230 through 250 before moving onto either operation 260 or operation 270, after either of which the method 200 returns to operation 230 again, and so on. In this way, the method 200 approximates and maintains an optimal frequency of transmitting the sounding frame.

Of course, it is contemplated that in other embodiments, depending on the decision metrics chosen, other ways of comparing the measurements and the thresholds for the decision metrics and of changing the sounding interval or performing other operations accordingly may be possible. For example, in another embodiment, the sounding interval is increased when all the measurements have not been above the thresholds, and the sounding interval is decreased when all the measurements have been above the thresholds.

Figure 3:
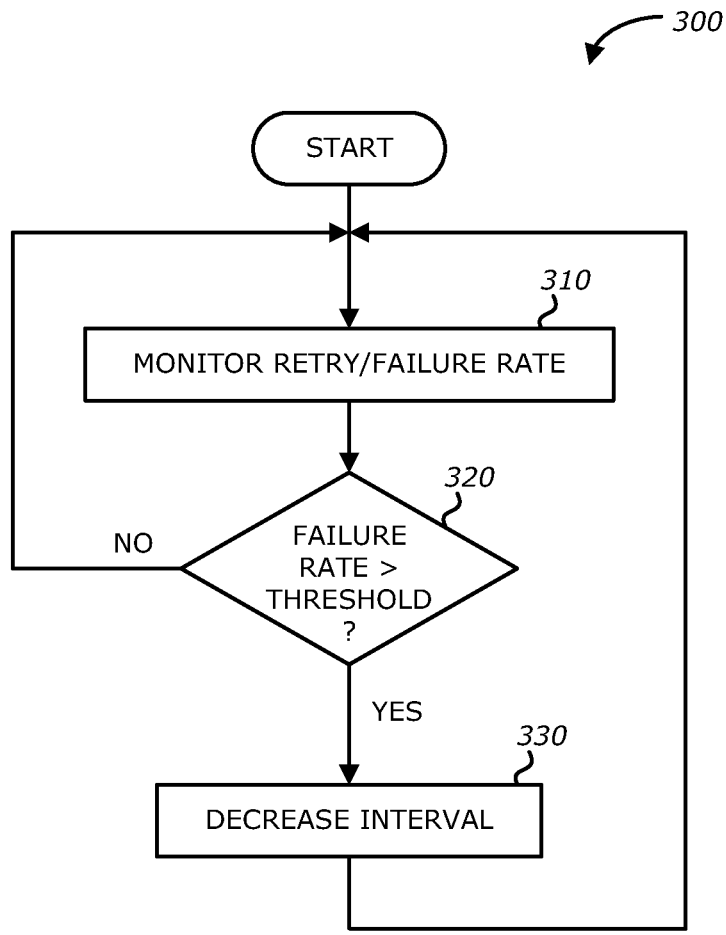
FIG. 3 is an exemplary flowchart illustrating a method for decreasing the interval between sounding frames according to an aspect of the invention.

Referring to FIG. 3, an exemplary flowchart illustrating a method 300 for decreasing the interval between transmissions of two sounding frames according to an aspect of the invention is shown. At operation 310, the retry/failure rate for a given beamformee client-set is monitored. At operation 320, it is determined whether the failure rate exceeds a predetermined threshold, and if yes, the method moves onto operation 330. At operation 330, the interval between transmissions of two sounding frames is decreased without regard to the thresholds defined at operation 240. Methods for determining the amount of the decrease that are applicable at operation 270 are equally applicable at operation 330. In one embodiment, the interval is decreased by a fixed number of milliseconds. In another embodiment, the interval is decreased to the midpoint between the current interval and the minimum interval defined at operation 210. After operation 330, the method 300 returns to operation 310, and so on.

Figure 4:
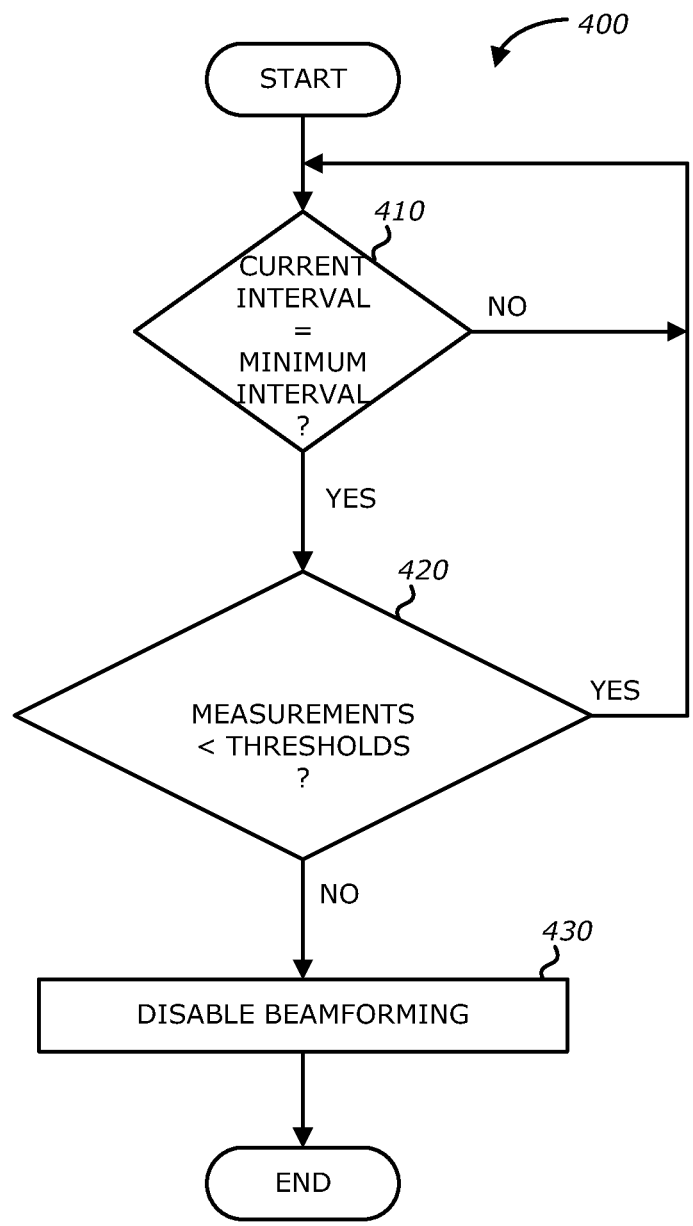
FIG. 4 is an exemplary flowchart illustrating a method for disabling beamforming according to an aspect of the invention.

Referring to FIG. 4, an exemplary flowchart illustrating a method 400 for disabling beamforming according to an aspect of the invention is shown. At operation 410, it is determined whether the current interval between transmissions of two sounding frames is the minimum interval defined at operation 210, and if yes, the method 400 moves onto operation 420. At operation 420, it is determined whether all the measurements for the one ore more decision metrics have been below the thresholds defined at operation 240 for the previous N feedback frames since the initialization or the last change in the interval between transmissions of two sounding frames, and if no, the method 400 moves onto operation 430. At operation 430, beamforming, including TxBF or MU-MIMO, is disabled, and the wireless digital network 100 reverts back to regular single-user MIMO Spatial Division Multiplexing (SDM) transmissions.

Figure 5:
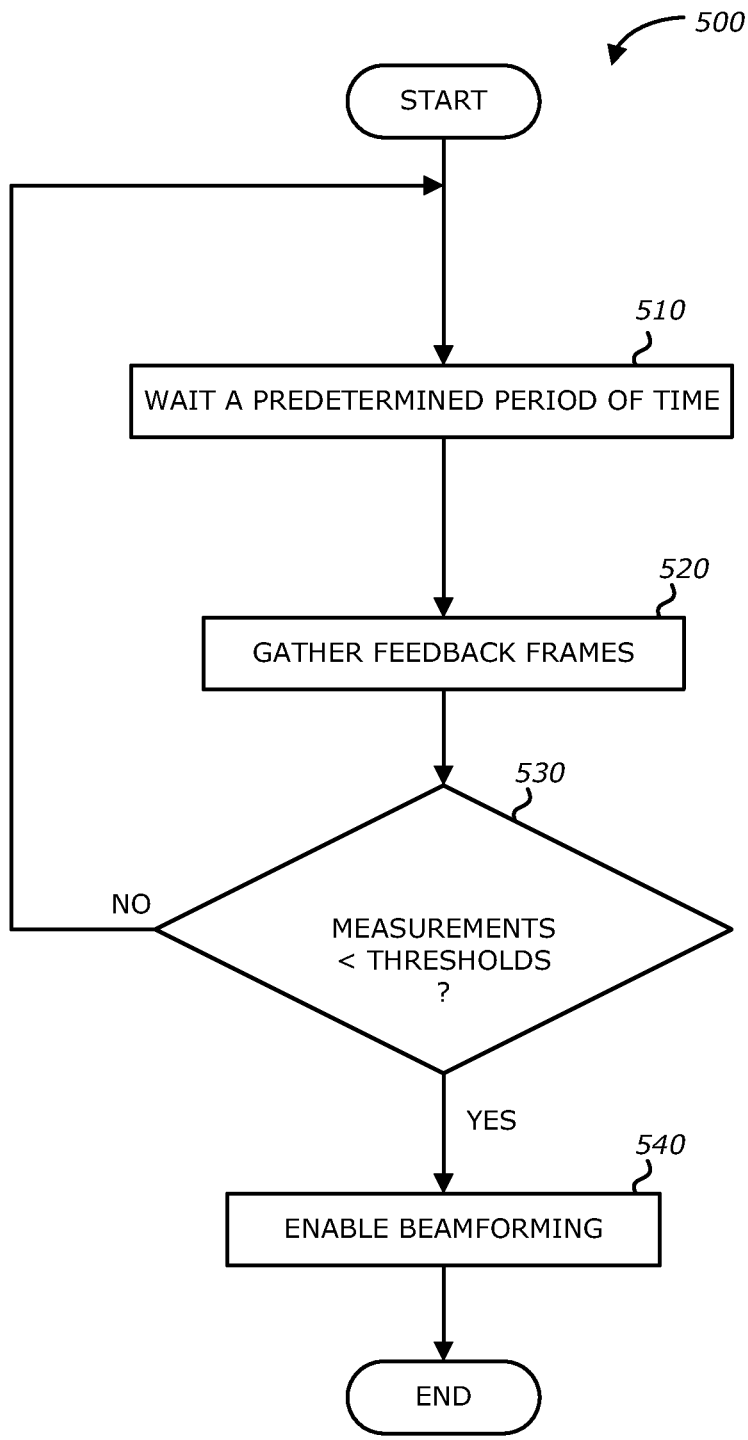
FIG. 5 is an exemplary flowchart illustrating a method for enabling beamforming according to an aspect of the invention.

Referring to FIG. 5, an exemplary flowchart illustrating a method 500 for enabling beamforming according to an aspect of the invention is shown. At operation 510, it is determined whether a predetermined period of time has passed since beamforming, including TxBF or MU-MIMO, was last active, and if yes, the method 500 moves onto operation 520. At operation 520, a predetermined number of explicit feedback cycles are performed to gather a predetermined number of feedback frames. At operation 530, it is determined whether all measurements for one or more decision metrics have been below predefined thresholds for the previous predefined number of feedback frames, and if yes, the operation moves onto operation 540. At operation 540, beamforming, including TxBF or MU-MIMO, is re-enabled.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer-readable medium storing computer program instructions that, when executed by one or more network devices, cause performance of operations comprising:

transmitting a first plurality of sounding frames in a multi-user multi-input multi-output (MU-MIMO) network, based on a first sounding interval, wherein the first sounding interval is a first period of time between transmissions of two sounding frames in the first plurality of sounding frames;

receiving a first plurality of feedback frames comprising information associated with the first plurality of sounding frames;

selecting a second sounding interval for transmitting a second plurality of sounding frames such that the second sounding interval is longer than the first sounding interval when a difference between information corresponding to a first frame in the first plurality of sounding frames and information corresponding to a second frame in the first plurality of sounding frames is below a threshold for a predefined number of frames in the first plurality of sounding frames and responsive to a determination that the first sounding interval is not at or above a predefined maximum time interval between transmission of two sounding frames;

selecting the second sounding interval for transmitting the second plurality of sounding frame such that the second sounding interval is shorter than the first sounding interval when the difference is not below the threshold for the predefined number of frames in the first plurality of sounding frames and responsive to a determination that the first sounding interval is not at or below a predefined minimum time interval between transmission of two sounding frames;

transmitting the second plurality of sounding frames in the MU-MIMO network, based on the second sounding interval, wherein the second sounding interval is a second period of time between transmissions of two sounding frames in the second plurality of sounding frames; and continuously adjusting a Nth sounding interval based on a (N−1)th plurality of feedback frames.

2. The non-transitory computer-readable medium of claim 1, wherein the first plurality of feedback frames comprise information associated with two consecutively transmitted sounding frames.

3. The non-transitory computer-readable medium of claim 1, wherein the information comprises Givens angles.

4. The non-transitory computer-readable medium of claim 1, wherein the difference is a minimum difference, a maximum difference, or an average difference between corresponding Givens angles or signal-to-noise ratio (SNR) figures in the information corresponding to the first frame in the first plurality of sounding frames and the information corresponding to the second frame in the first plurality of sounding frames across a plurality of sub carriers.

5. The non-transitory computer-readable medium of claim 1, wherein the second sounding interval is an average of the first sounding interval and the predefined maximum interval, or is an average of the first sounding interval and the predefined minimum interval.

6. The non-transitory computer-readable medium of claim 1, wherein the computer program instructions, when executed by one or more network devices, cause performance of further operations comprising:

disabling a beamforming technique when the first sounding interval is a predefined minimum internal, and when the difference is not below a threshold for a predefined number of frames in the first plurality of sounding frames.

7. The non-transitory computer-readable medium of claim 6, wherein the computer program instructions, when executed by one or more network devices, cause performance of further operations comprising:

after disabling the beamforming technique, re-enabling the beamforming technique when a predefined period of time has elapsed from the time the beamforming technique was disabled, and when the difference is below the threshold for the predefined number of frames in the first plurality of sounding frames.

8. The non-transitory computer-readable medium of claim 1, wherein the second sounding interval is shorter than the first sounding interval when a failure rate at a beamformee exceeds a predefined threshold.

9. The non-transitory computer-readable medium of claim 1, wherein the second sounding interval and the first sounding interval differ by a fixed number of milliseconds.

10. The non-transitory computer-readable medium of claim 1, wherein the information comprises signal-to-noise ratio (SNR) information corresponding to the first plurality of sounding frames.

11. The non-transitory computer-readable medium of claim 10, wherein:

the second sounding interval is selected based at least in part on the signal-to-noise ratio (SNR) information corresponding to the first plurality of sounding frames.

12. An apparatus with beamforming capabilities for wirelessly transmitting data, comprising:

a transceiver;
a plurality of antennas coupled to the transceiver;
a controller coupled to the transceiver to control the transceiver and the plurality of antennas; and
a non-transitory memory coupled to the controller, the memory containing instructions which, when executed by the controller, cause the controller to:

drive the transceiver and the plurality of antennas to transmit a first plurality of sounding frames in a multi-user multi-input multi-output (MU-MIMO) network, based on a first sounding interval, wherein the first sounding interval is a first period of time between transmissions of two sounding frames in the first plurality of sounding frames;

drive the transceiver and the plurality of antennas to receive a first plurality of feedback frames comprising information associated with the first plurality of sounding frames;

select a second sounding interval for transmitting a second plurality of sounding frames such that the second sounding interval is longer than the first sounding interval when a difference between information corresponding to a first frame in the first plurality of sounding frames and information corresponding to a second frame in the first plurality of sounding frames is below a threshold for a predefined number of frames in the first plurality of sounding frames and responsive to a determination that the first sounding interval is not at or above a predefined maximum time interval between transmission of two sounding frames;

select the second sounding interval for transmitting the second plurality of sounding frames such that the second sounding interval is shorter than the first sounding interval when the difference is not below the threshold for the predefined number of frames in the first plurality of sounding frames and responsive to a determination that the first sounding interval is not at or below a predefined minimum time interval between transmission of two sounding frames;

drive the transceiver and the plurality of antennas to transmit the second plurality of sounding frames in the MU-MIMO network, based on the second sounding interval, wherein the second sounding interval is a second period of time between transmissions of two sounding frames in the second plurality of sounding frames; and continuously adjust a Nth sounding interval based on a (N−1)th plurality of feedback frames.

13. The apparatus of claim 12, wherein the first plurality of feedback frames comprise information associated with two consecutively transmitted sounding frames.

14. The apparatus of claim 12, wherein the information comprises Givens angles.

15. The apparatus of claim 12, wherein the difference is a minimum difference, a maximum difference, or an average difference between corresponding Givens angles or signal-to-noise ratio (SNR) figures in the information corresponding to the first frame in the first plurality of sounding frames and the information corresponding to the second frame in the first plurality of sounding frames across a plurality of subcarriers.

16. The apparatus of claim 12, wherein the information comprises signal-to-noise ratio (SNR) information corresponding to the first plurality of sounding frames.

17. The apparatus of claim 12, wherein the second sounding interval is shorter than the first sounding interval when a failure rate at a beamformee exceeds a predefined threshold.

* * * * *